United States Patent [19]

Greene et al.

[11] Patent Number: 5,266,191
[45] Date of Patent: Nov. 30, 1993

[54] IMMISCIBLE LIQUIDS SEPARATOR APPARATUS AND METHOD

[75] Inventors: Boyd B. Greene; Naji J. Nassif, both of Memphis; Anderson Scott, Jr., Germantown, all of Tenn.

[73] Assignee: Newberry Tanks & Equipment, Inc., West Memphis, Ark.

[21] Appl. No.: 935,242

[22] Filed: Aug. 27, 1992

[51] Int. Cl.$^5$ ............................................. C02F 1/40
[52] U.S. Cl. ................................. 210/195.1; 210/257.1; 210/305; 210/519; 210/521; 210/538
[58] Field of Search ............. 210/194, 195.1, 257.1, 210/259, 304, 305, 519, 521, 532.1, 536, 538, 540

[56]  References Cited

U.S. PATENT DOCUMENTS

| | | | |
|---|---|---|---|
| 2,868,384 | 1/1959 | Puddington | 210/521 |
| 3,419,145 | 12/1968 | De Celis | 210/84 |
| 3,849,311 | 11/1974 | Jakubek | 210/521 |
| 3,914,175 | 10/1975 | Kunz et al. | 210/521 |
| 3,933,654 | 1/1976 | Middelbeek | 210/521 |
| 4,042,512 | 8/1977 | McCarthy et al. | 210/519 |
| 4,115,279 | 9/1978 | Toft | 210/521 |
| 4,123,365 | 10/1978 | Middelbeek | 210/521 |
| 4,132,652 | 1/1979 | Anderson et al. | 210/536 |
| 4,238,333 | 12/1980 | Tidwell | 210/800 |
| 4,271,017 | 6/1981 | Milgram | 210/95 |
| 4,308,136 | 12/1981 | Warne, Jr. | 210/114 |
| 4,385,986 | 5/1983 | Jaisinghani et al. | 210/123 |
| 4,619,771 | 10/1986 | Stall et al. | 210/519 |
| 4,722,800 | 2/1988 | Aymong | 210/802 |
| 4,830,755 | 5/1989 | Hardin | 210/662 |
| 4,869,814 | 9/1989 | Hughes et al. | 210/195.1 |
| 4,983,287 | 1/1991 | Arnold | 210/259 |
| 5,114,578 | 5/1992 | Sundstrom | 210/521 |

FOREIGN PATENT DOCUMENTS 555806 7/1932 Fed. Rep. of Germany .
2715049 10/1978 Fed. Rep. of Germany .

OTHER PUBLICATIONS

National Tank, *Oil and Gas Separation* (1964).

Walter L. Hampton, *Introduction To Fluid Separation* (1973).
Marathon Petroleum Company, *Oil/Water Separator, 5000 Gallon* (1988) (Fabrication Drawing).
R. Byron Bird, Warren E. Stewart & Edwin N. Lightfoot, *Transport Pneomena* (1960) pp. 56–60; pp. 192–194.
William S. Janna, *Introduction to Fluid Mechanics* (2d ed. 1987) pp. 170–174.
Robert H. Perry, Don W. Green & James O. Maloney; *Perry's Chemical Engineers' Handbook*, (6th ed. 1984) pp. 21-64 to 21-66; pp. 5-63 to 5-64.
Francis W. Sears, Mark W. Zemansky, & Hugh D. Young, *University Physics* (7th ed. 1987) pp. 329–332.

Primary Examiner—Christopher Upton
Attorney, Agent, or Firm—Walker, McKenzie, & Walker

[57]  ABSTRACT

An apparatus and method for removing articles of a first liquid from a second liquid using law, the first liquid, such as oil, having a greater buoyancy than the second, such as water, with both liquids being immiscibly combined into a flowing fluid mixture. Surges in the mixture's flow are dampened, and the mixture is constrained to have a limited horizontal flow velocity through the tank of the apparatus. A separator chamber with a plurality of parallel subchannels formed by spaced vertical plates has a geometry that reduces and controls the Reynolds number of the subchannels and controls the velocity through the subchannels, causing the flow therethrough to be substantially non-turbulent. A first gate inhibits the flow of sediment into the separator chamber. The flow path length through the separator chamber is such that the particles will have sufficient time to rise above a downstream exit, near the bottom of the separator chamber, and into a holding chamber. A transverse velocity gradient formed within the subchannels cause the particles to spin and follow a curved path toward the lower longitudinal velocity regions adjacent the walls of the subchannels where the particles agglomerate and rise to the surface. A vertical rising unit is optionally provided to remove very tiny particles that have insufficient buoyancy to rise above the separator chamber's exit, and various filters may remove other impurities.

29 Claims, 3 Drawing Sheets

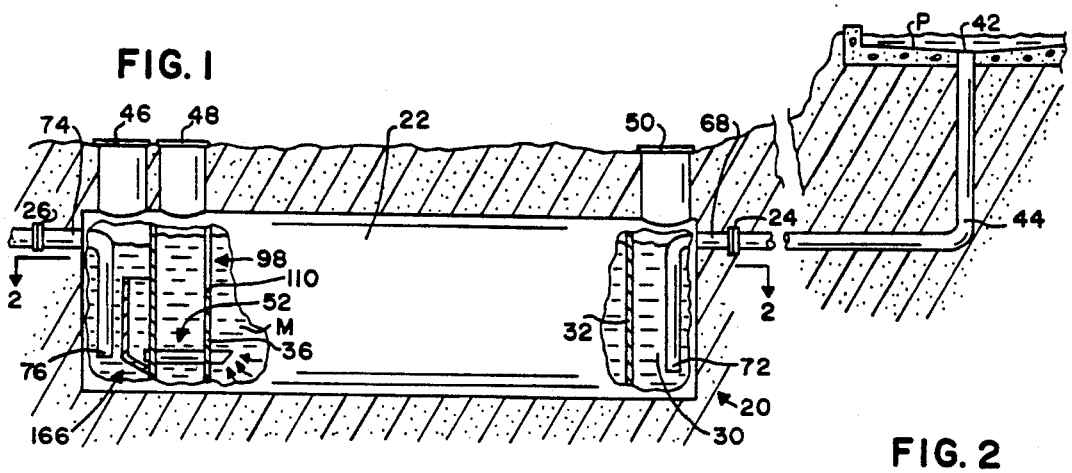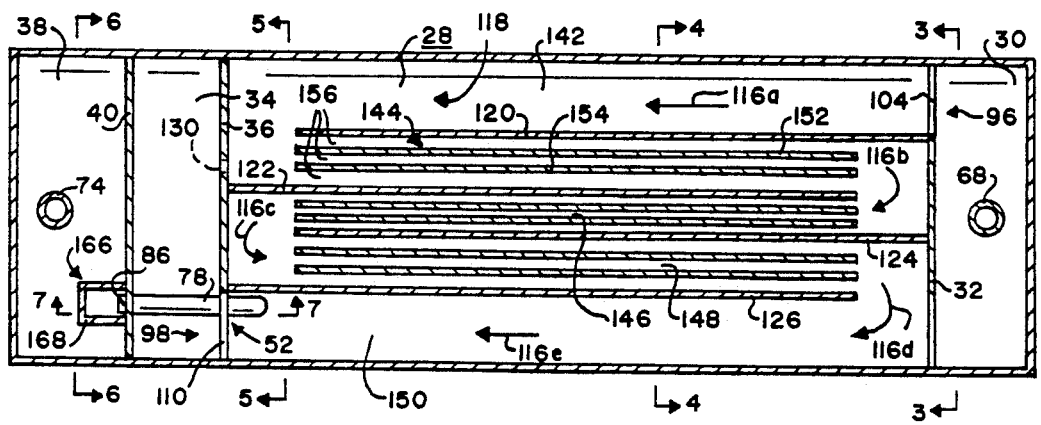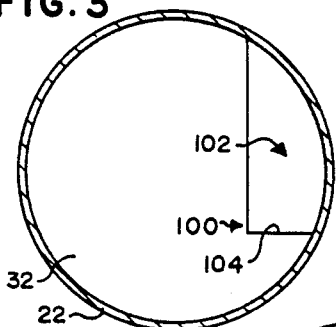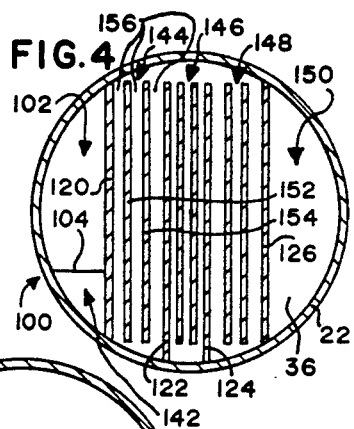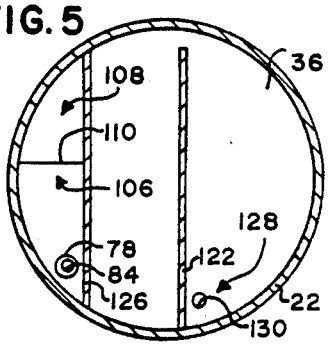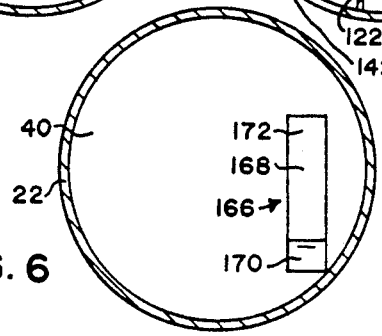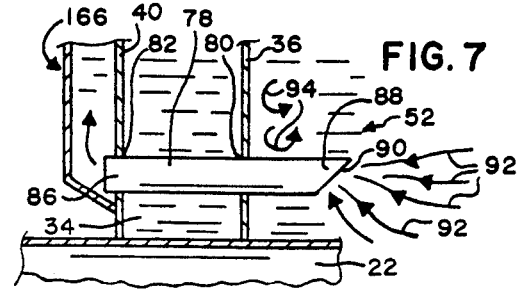

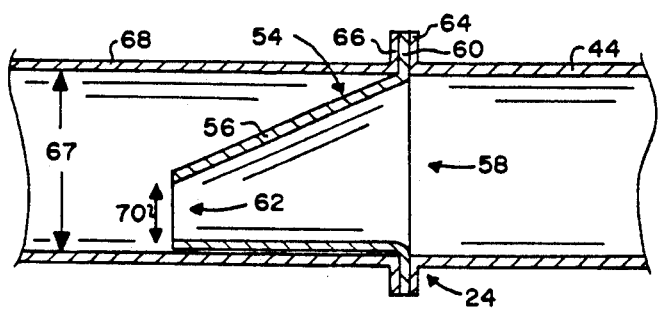
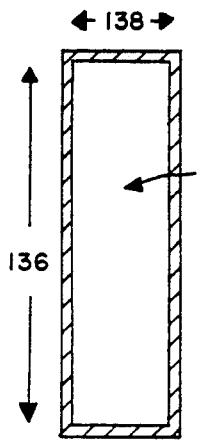
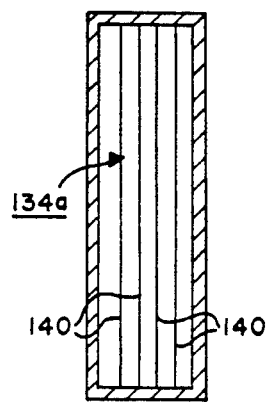
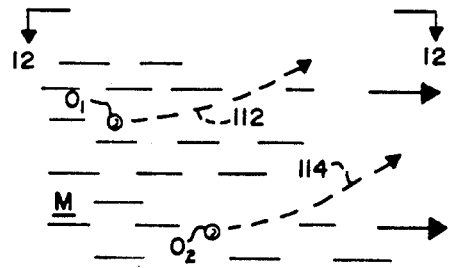
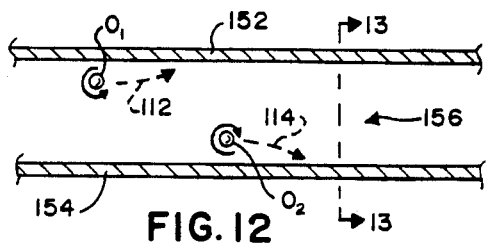
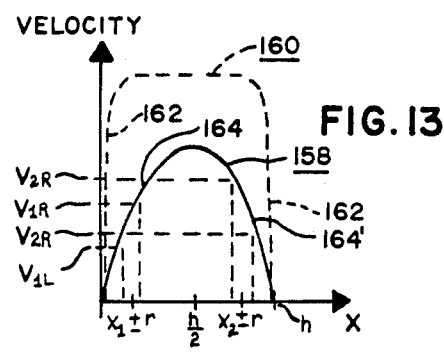
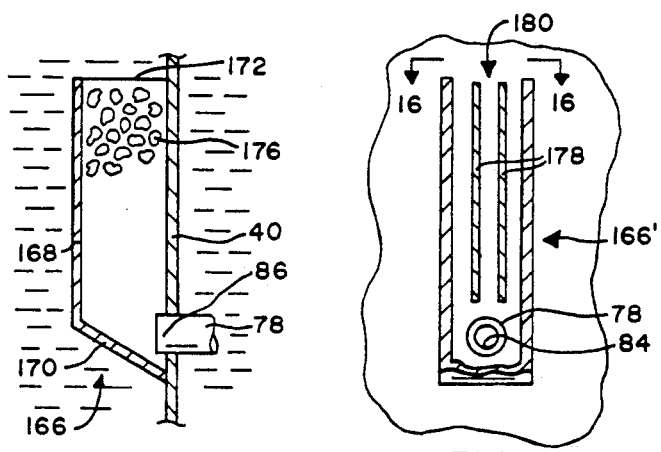
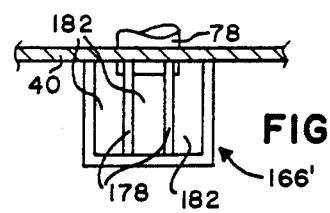

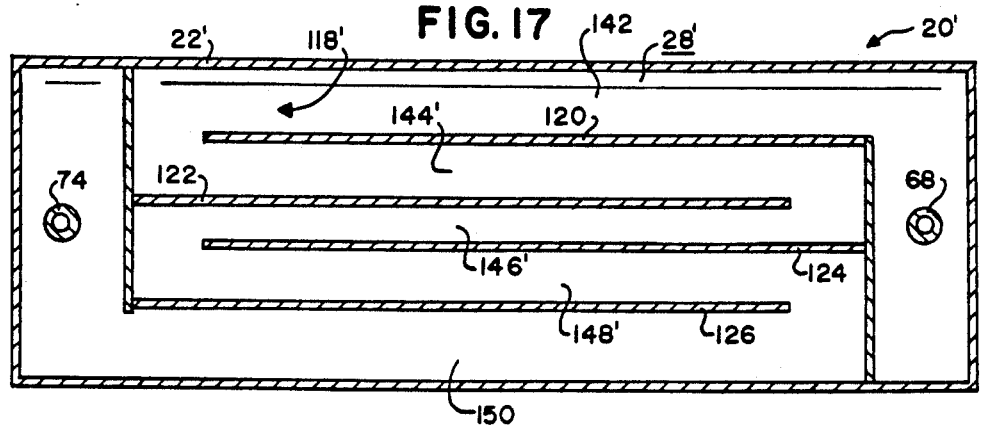
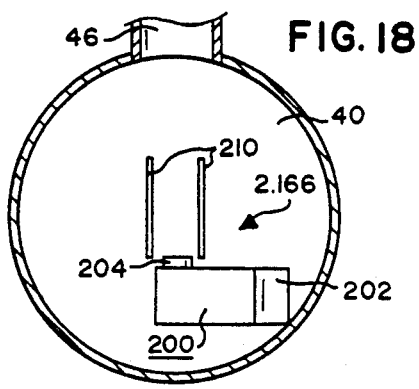
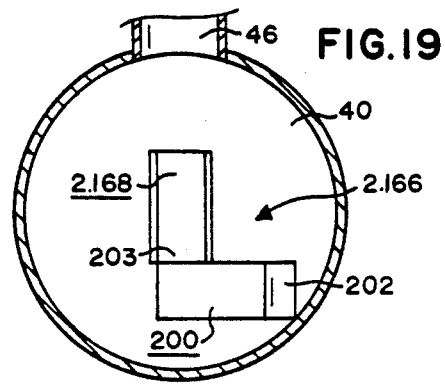
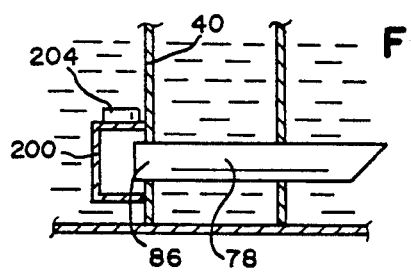
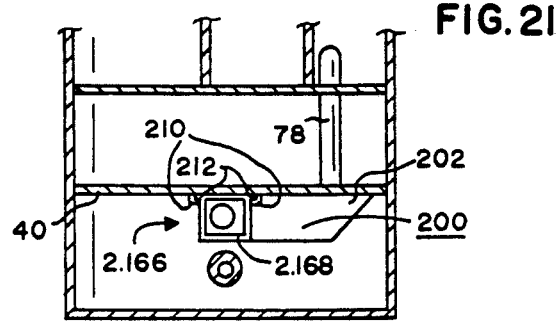

IMMISCIBLE LIQUIDS SEPARATOR APPARATUS AND METHOD

BACKGROUND OF THE INVENTION

1. Field of the Invention:

The present invention in general, to an apparatus and method for separating two immiscible liquids of different densities such as oil and water and also for removing sediment therefrom, and in particular, to an apparatus and method for separating immiscible particles and solids from a flowing fluid mixture using the buoyancy principles embodied in Stokes' law.

2. Description of the Related Art:

It is often desired to remove immiscible oil particles from runoff or drainage discharge water so as to avoid polluting streams, lakes, wells, or the like. As concern increases for the environment, the various states as well as the federal government have imposed regulations governing the quality of such effluent water. Such effluent water might be seen, for instance, as surface runoff from a parking lot during periodic rainfalls.

Prior solutions for this problem have attempted to use the principles of Stokes' law, $$F = 6\pi \eta r v_0$$

which expresses the drag force F exerted on a sphere, such as an oil particle, of radius r moving with a rise speed $V_0$, through a fluid, such as water, that has a viscosity $\eta$. The oil particle naturally tends to rise due to the forces of gravity because it has a lower density $\rho_O$ than that of water, $\rho_W$, thereby causing the oil particle to have buoyant forces thereupon. However, in order for Stokes' law to strictly apply, the fluid must be quiescent and non-moving, or, at best, a "creeping flow," and the particles must be substantially rigid (non-deformable) spheres. In such a situation, there is no separation of liquid from the rear of the rising sphere as it moves, and viscous effects dominate the particle's movement. The Reynolds number $R_O$ of the oil particle, governing its rise through water, is well-known to be $$R_O = \frac{\rho_W v_O d}{\eta}$$

where d is the diameter of the spherical oil particle. If the Reynolds rise number $R_O$ is greater than 0.1, the drag force F on the sphere will be underpredicted and the oil particle will rise more slowly than expected. For instance, if $R_O$ is 1.0, the drag force F will be underpredicted by a factor of ten percent (10%). See R. Byron Bird, Warren E. Stewart, and Edwin N. Lightfoot, *Transport Phenomena* 192-94 (1960).

The preceding discussion shall be understood to apply primarily to small oil particles only, in the range of ten to twenty microns in diameter and below, which are the hardest particles to remove. Larger diameter liquid spheres will have higher terminal velocities than that predicted by Stokes' Law due to internal liquid circulation within the spheres in a manner well-known to those skilled in the art. Liquid within larger spheres at the interface between the sphere and the surrounding fluid will tend to move along with the surrounding fluid flow and recirculate back along the axis of the sphere, thereby reducing drag forces at the boundary interface of the sphere. As the spheres become even larger, they tend to deform into an "inverted teardrop" shape, further reducing the drag forces because of the more aerodynamic shape of the deformed particle. See Robert H. Perry, Don W. Green, and James O. Maloney, *Perry's Chemical Engineers' Handbook* at 5-63 to 5-64 (6th ed. 1984). Small oil particles, however, are substantially rigid spheres without appreciable deformation or internal circulation, and therefore are the hardest particles to remove.

Furthermore, when the speed with which an oil-water fluid mixture flows through any oil-removal apparatus exceeds a certain critical value, which depends on properties of the fluid and the channels within the apparatus, the flow of the oil-water fluid mixture becomes turbulent, not laminar. This turbulence renders Stokes' law, which describes the drag force on a particle in a quiescent fluid, inapplicable. A measure of the turbulence within a channel of flowing fluid, such as an oil-water mixture, is given by the Reynolds number $R_C$ for the channel, defined by the well-known relationship $$R_C = \frac{\rho_W v_{AV} D_H}{\eta}$$

where $D_H$ is the well-known "hydraulic diameter" of the channel and $v_{AV}$ is the average velocity of the fluid through the channel. If $R_C$ is less than 2,000, the flow is completely laminar and non-turbulent. If $R_C$ is greater than 10,000, the flow is completely turbulent and non-laminar. As $R_C$ moves between these values, the flow goes from being completely laminar to being completely turbulent.

Previous known solutions have employed various inclined planes and baffles to separate oil particles from water, but have not addressed the inapplicability of Stokes' law to a moving flow of water. Such incomplete solutions to the oil-water separation problem yield less than optimal removal of oil from the oil-water mixture, and are known to degrade significantly in performance as oil accumulates at the upper surface within the apparatus and lowers the boundary between the removed oil and the flowing oil-water mixture therebelow. Other approaches employing various filters and the like have a known tendency to clog and become blocked with sediment. Other known approaches employ centrifugal forces, unlike the present invention, to separate oil from water.

It shall be understood that, while the present application uses oil and water as an example of two immiscible liquids of differing density, the problems faced by the present invention and its novel solution are equally applicable to other immiscible liquids of differing densities (buoyancies), in a manner that those skilled in the art will readily recognize.

It is therefore desirable to have both an apparatus and method for separating two immiscible liquids of different density, and in particular, for separating particles of one such liquid from a fluid mixture with the other, that addresses these problems of turbulence and clogging and therefore improves the removal of the particulate. The apparatus should have no moving parts requiring service, should not suffer significant performance degradations as removed liquid begins to accumulate within the apparatus, and the resulting purified liquid should exceed applicable state and federal regulations governing discharged effluent.

SUMMARY OF THE INVENTION

The present invention is both an apparatus and a method for separating two immiscible liquids of different densities, the first liquid being in particulate form suspended as particles in the second liquid, as, for example, oil particles within water. The fluid mixture is constrained to have a limited flow velocity through the apparatus and the geometry of the channels through the apparatus are such that the flow of the mixture is substantially laminar and non-turbulent. Because this slowly moving flow approximates a quiescent liquid, the principles of Stokes' law may be used to calculate the drag forces, and therefore the terminal rise velocity, of the particles through the water with which they are mixed.

A separator chamber with a plurality of parallel subchannels formed by spaced vertical plates has a geometry such that the Reynolds number for the subchannels has a low value, thereby causing the flow therethrough to be substantially non-turbulent. In a simplified version of the present invention the parallel subchannels can be omitted, and the separator chamber merely has a long serpentine channel therethrough. The flow path length through the separator chamber is such that, given a constrained maximum flow velocity through the separator chamber, the particles will have sufficient time to rise above a downstream exit, near the bottom of the separator chamber, and into a holding chamber. Furthermore, a transverse velocity gradient formed within the subchannels causes the particles to spin and thereby follow a curved path toward the lower longitudinal velocity regions adjacent the walls of the subchannels, where the particles then agglomerate and rise to the surface. Provision is also made for various final filters or other means for removing various impurities and very tiny particles that have insufficient buoyancy to rise above the separator chamber's exit.

It is an object of the present invention to provide means for controlling the flow of the mixture of the two immiscible fluids of different densities through the separator apparatus to be substantially laminar so that the principles of Stokes' law may be employed. The geometry and structure of the apparatus are such that significant performance degradations in the purity of the resulting effluent are not seen as the apparatus fills with removed liquid.

BRIEF DESCRIPTION OF THE DRAWINGS

FIG. 1 is a side view of the present invention buried beneath the ground with portions removed showing the various chambers therein.

FIG. 2 is a longitudinal top sectional view of the present invention taken substantially along the line 2—2 shown in FIG. 1.

FIG. 3 is a transverse sectional view of the present invention taken substantially along the line 3—3 shown in FIG. 2, showing the bulkhead separating the influent chamber from the separator chamber.

FIG. 4 is a transverse sectional view of the present invention taken substantially along the line 4—4 shown in FIG. 2, showing the spacing of the various plates in the separator chamber.

FIG. 5 is a transverse sectional view of the present invention taken substantially along the line 5—5 shown in FIG. 2, showing the bulkhead separating the oil holding chamber from the separator chamber.

FIG. 6 is a transverse sectional view of the present invention taken substantially along the line 6—6 shown in FIG. 2, showing the vertical rising unit within the effluent chamber.

FIG. 7 is a partial sectional view of the present invention taken substantially along the line 7—7 shown in FIG. 2, showing the details of the surge control means.

FIG. 8 is a transverse side sectional view of the inlet flow rate control means of the present invention.

FIG. 9 is a diagrammatic view of a transverse section of an arbitrary channel undivided into separate parallel subchannels.

FIG. 10 is a diagrammatic view of the channel of FIG. 9, subdivided into a number of parallel subchannels.

FIG. 11 is a side view of the path of two oil particles rising in a slowly flowing stream of oil and water through the separator chamber of the present invention.

FIG. 12 is a top view of the oil particles shown in FIG. 11, taken substantially along the line 12—12 shown in FIG. 11, showing the curved movement of the oil particles toward the plates in the separator chamber of the present invention.

FIG. 13 is a velocity profile graph showing the velocity of the oil-water stream at various points across the subchannel shown in FIG. 12, taken substantially across the transverse plane indicated by the line 13—13 shown in FIG. 12.

FIG. 14 is a side sectional view taken through one embodiment of the vertical rising unit, showing the filling thereof with filter material.

FIG. 15 is an end sectional view taken through another embodiment of the vertical rising unit, showing the parallel-spaced plates therein.

FIG. 16 is a top view of the vertical rising unit shown in FIG. 15, taken substantially along the line 16—16 shown in FIG. 15.

FIG. 17 is a longitudinal top sectional view of a simplified embodiment of the present invention.

FIG. 18 is a transverse sectional view of the present invention, taken similarly as to FIG. 6, showing an alternate embodiment of the vertical rising unit with the riser cartridge removed.

FIG. 19 is a transverse sectional view of the alternate embodiment of the vertical rising unit of the present invention similar to FIG. 18, but with the riser cartridge in place.

FIG. 20 is a partial sectional view of the present invention, taken similarly as to FIG. 7, showing the details of the surge control mean with the alternate embodiment of the vertical rising unit.

FIG. 21 is a partial top sectional view of the alternate embodiment of the vertical rising unit of the present invention.

DESCRIPTION OF THE PREFERRED EMBODIMENT

Referring to FIGS. 1-7, separator apparatus 20, for removing particles of one immiscible liquid from another having a different density, such as, for example, for removing oil particles with a greater buoyancy (or, equivalently, a lighter density) than water from a slowly moving oil-water fluid mixture M, is shown. Separator apparatus 20 is seen to comprise a tank 22 having an inlet 24 through which oil-water mixture M enters separator apparatus 20, an outlet 26 through which purified water exits separator apparatus 20, and a separator chamber 28. Although tank 22 is shown in the drawings as being preferably cylindrical and constructed of metal, it shall be understood that other shapes, i.e., rectangular, and other materials, such as concrete or well-known epoxy-glass fiber (fiberglass) are equally suitable. It shall also be understood that, while oil and water are used as an example of two immiscible liquids of differing density for purposes of illustration herein, the present invention is applicable to other immiscible liquids of differing densities (buoyancies) as well In addition to separator chamber 28, separator apparatus 20 also has an influent chamber 30 separated from separator chamber 28 by a baffle or bulkhead 32 and interposed between separator chamber 28 and inlet 24, an oil holding chamber 34 downstream of separator chamber 28 and separated from separator chamber 28 by another baffle or bulkhead 36, and finally an effluent chamber 38 separated from oil holding chamber 34 by a third baffle or bulkhead 40 and interposed between separator chamber 28 and outlet 26. Oil holding chamber 34 has an opening or entrance 108 thereinto from separator chamber 28, causing the two chambers to thereby be in communication one with the other. Typically buried underground as shown for processing the runoff or drainage discharge water from a collection point such as a parking lot P through drain 42 and pipe 44 to inlet 24, separator apparatus 20 may have one or more access hatches 46, 48, and 50, respectively in communication with, and providing access for maintenance personnel to, effluent chamber 38, oil holding chamber 34, and influent chamber 30.

As will be explained in greater detail below, for proper operation of the present invention the flow velocity of oil-water mixture M through separator apparatus 20 must be controlled to be below a certain maximum value. To this end, the present invention includes limiting means for constraining the flow of the oil-water mixture M to be below this certain maximum velocity. This limiting means preferably includes both surge control means 52 interposed between separator chamber 28 and outlet 26 for dampening fluctuations in the flow of the purified water out of separator chamber 28 to outlet 26, as well as inlet flow rate control means 54 shown in FIG. 8 at inlet 24 and interposed between inlet 24 and separator chamber 28 for constraining the volume flow rate of the oil-water fluid mixture M entering inlet 24.

Referring to FIGS. 1 and 8, inlet flow rate control means 54 preferably comprises a tapered reducing nozzle 56 having an enlarged mouth 58 at one end spanning inlet 24, with a flange 60 extending outwardly from mouth 58, and with nozzle 56 further having a narrowed throat 62 downstream of mouth 58 and eccentrically downwardly offset with respect to mouth 58. Flange 60 is seen to be sandwiched between mating flange 64 on pipe 44 and flange 66 on inlet 24, and is sealed therebetween in a manner well-known to those skilled in the art as with clamps or bolts, not shown. While a mere constriction plate (not shown) with a small opening therethrough could be used to reduce the flow through inlet 24, a plate would not be as desirable as the present nozzle 56 because such a plate would tend to increase turbulence and thereby emulsify the oil-water mixture passing therethrough. A further advantage of nozzle 56 is that, by being tapered with no sudden obstructions and being eccentrically offset downwardly, sediment and other particulate will not tend to collect at inlet flow rate control means 54, thereby reducing blockage and maintenance caused therefrom, in a manner that will now be apparent. This sediment and particulate will, with the preferred design using tapered nozzle 56, instead pass through inlet flow rate control means 54 into tank 22 where it will accumulate for easy removal at some later scheduled time as will now be understood. The ratio of the inner diameter $D_I$ (shown as reference numeral 67) of influent pipe 68 to the reduced inner diameter $D_R$ (shown as reference numeral 70) of throat 62, will depend on the particular application of the present invention, and can be easily determined by those skilled in the art once the certain maximum flow velocity through separator apparatus 20 has been specified as discussed below. Similarly, the inner diameter $D_I$ of influent pipe 68 will be defined by the capacity and size of separator apparatus 20 based upon, typically, a minimum of three feet of head pressure from a drainage system such as parking lot P connected by drain 42 and pipe 44. It shall be understood that, in certain situations, the capacity and size of separator apparatus 20 will greatly exceed the demands placed upon it by effluent draining from parking lot P, and inlet flow rate control means 54 may be omitted because the inlet flow, in such cases, will already be below the maximum permissible volume flow rate.

For example, the design goal volume flow rate Q in cubic feet per second, from a catch basin, such as parking lot P, having a surface area of $A_P$ will typically be specified so as to handle the discharge rate from the catch basin filled by a so-called "25 year rainfall" (in inches per day) with a surge intensity of a specified number of inches of rainfall per hour. A typical oil separator might be specified to handle 0.47 cubic feet per second for each 10,000 square feet of surface area drained.

If the fluid level over parking lot P at drain 42 is defined to have a height $h_1$ above the bottom of tank 22, and the fluid level within influent chamber 30 of separator tank 22 is defined to have a height $h_2$ above the bottom of tank 22, then a "head" of $$\Delta H_I = h_1 - h_2$$

will be seen at inlet 24. Under steady-state conditions, heights $h_1$ and $h_2$ will remain constant, and the well-known modified Bernoulli's equation can be applied. A straightforward application of the modified Bernoulli's equation to the discharge flow from drain 42 to inlet 24 yields $$\frac{P_1}{\rho_W} + h_1 + \frac{v_1^2}{2G} = \frac{P_2}{\rho_W} + h_2 + \frac{v_2^2}{2G} + (h_F + h_E + h_I)$$

where: $P_1$ and $P_2$ are the external pressures applied at drain 42 and influent chamber 30, respectively (here, since the system is an open system, $P_1$ and $P_2$ are each equal to the atmospheric pressure); $v_1$ and $v_2$, the velocities of the respective liquid-air interfaces at height $h_1$ over parking lot P and height $h_2$ within influent chamber 30, are both equal to zero because, during steady state, the locations (heights) of the fluid surfaces at $h_1$ and $h_2$ remain constant and unchanged; G is the well-known gravitational acceleration constant; $h_F$ is the "head" loss due to friction within pipe 44; $h_E$ is the "head" loss at the entrance, exit, and fittings of pipe 44; $h_I$ is the "head" loss due to inlet flow rate control means 54; and, as before, $\rho_W$ is the density of the flowing water-oil mixture, approximately that of water alone.

Rearranging terms in this equation and cancelling equal quantities on each side yields the result $$\Delta H_I = h_1 - h_2 = h_F + h_E + h_I.$$

In the more general case, where pipe 44 comprises multiple pipe sections and elbows, each with differing diameters, the terms on the right-hand side of this equation can be understood to each be the summation of the effects of the various pipes and elbows. Therefore, substituting into this equation the well-known equivalences $$h_F = \Sigma \left( f \frac{L_I}{D_I} \frac{v_I^2}{2G} \right)$$

and $$h_E = \Sigma \left( k \frac{v_I^2}{2G} \right),$$

where: each summation is over the subscript I, representing each supply pipe such as, for instance, pipe 44; $L_I$ is the length of each supply pipe; $v_I$ is the fluid velocity through each pipe; f is a measured friction factor for each pipe; k is a loss coefficient for the entrance, exit, elbows, and valves, etc. for each pipe; and, from before, $D_I$ is the inner diameter of each pipe, yields the relationship, after rearranging terms, of $$h_I = \Delta H_I - h_F - h_E = \Delta H_I - \Sigma \left( f \frac{L_I}{D_I} \frac{v_I^2}{2G} \right) - \Sigma \left( k \frac{v_I^2}{2G} \right),$$

expressing the required "head" loss $h_I$ at inlet flow rate control means 54.

It is further advisable that the fluid velocity in pipe 44 be less than some maximum velocity such as, for example, 4.25 feet per second, in order to prevent hydraulic jumps that often occur in open channel flows and to thereby reduce mixing and emulsification of the oil and water. This external constraint on separator apparatus 20 is not part of the present invention proper, and can be met, in a manner well-known to those skilled in the art, by proper sizing of external pipe 44.

For a given separator apparatus 20 having a specified maximum supported volume flow rate Q in cubic feet per second, determined in a manner hereinafter discussed, some maximum allowable flow rate through pipe 44 will exist for proper operation of separator apparatus 20. If the measured value is below this maximum, then no inlet flow control means 54 is required. If the design maximum is exceeded, then the "head" must be accordingly reduced, until the design parameters are met, using an appropriately sized tapered reducing nozzle 56, in a manner well-known to those skilled in the art.

The limiting means for constraining the flow through separator apparatus 20 of the oil-water mixture M also preferably comprises surge control means 52 for dampening or modulating fluctuations in the flow of purified water out of separator chamber 28 to outlet 26. Referring to FIGS. 1, 2, 5, and 7, the details of surge control means 52 may be seen, whose purpose is to increase the time it takes for liquid to start exiting separator chamber 28 from the instant a surge of liquid enters separator chamber 28, for reasons hereinafter given.

Influent pipe 68 is seen to pass through the wall of tank 22 into influent chamber 30 and terminate at an end 72 disposed toward the bottom of influent chamber 30. Similarly, effluent pipe 74 is seen to pass through the wall of tank 22 into effluent chamber 38 and terminate at an end 76 disposed toward the bottom of effluent chamber 38, thereby placing outlet 26 in communication therewith. In the preferred embodiment, effluent pipe 74 will pass through the wall of tank 22 at a height below that at which influent pipe 68 passes through the wall of tank 22 as shown, for reasons hereinafter described. From before, the liquid level within influent chamber 30 is defined to be a height $h_2$ above the bottom of tank 22. Additionally, the liquid level within effluent chamber 38 is defined to be a height $h_3$ above the bottom of tank 22. As oil accumulates on the surface of the oil-water mixture within separator chamber 28 and influent chamber 30 after normal operation of separator apparatus 20, the relatively pure water within effluent chamber 38 will, by the well-known manometer effect, cause liquid level height $h_2$ to rise above liquid level height $h_3$ because oil is lighter than water. After a quantity of effluent discharge has been processed in accordance with the current invention, and no further influent mixture is flowing into separator apparatus 20 through influent pipe 68, it will be understood that the relatively pure water within effluent chamber 38 will drain through outlet 26 until liquid level height $h_3$ is approximately at the same height as that point at which effluent pipe 74 passes through the wall of tank 22. In accordance with the aforementioned manometer effect, liquid level height $h_2$ within influent chamber 30 will be some distance above the liquid level within effluent chamber 38. Furthermore, in this quiescent state in which no influent mixture is entering separator apparatus 20 through influent pipe 68, oil particles and some sediment already within the oil-water mixture inside influent pipe 68 will tend to rise, over time, upwardly within the downwardly extending portion of influent pipe 68. If influent pipe 68 passes through the wall of tank 22 at a sufficient height above the surface of the mixture within influent chamber 30, it will now be understood that oil and sediment rising to the surface within influent pipe 68 will be below inlet 24, and will therefore not accumulate and sediment within the horizontal portions of influent pipe 68. It should be noted that the oil level at the upper surface of the oil-water mixture within the vertical portion of influent pipe 68 during quiescent resting conditions will not be the same as that within the rest of tank 22 because of the relatively low oil particle concentrations within the influent oil-water mixture which subsequently rise upwardly within pipe 68 when no influent is flowing. In contrast, a substantial amount of oil will accumulate at the surface within separator chamber 28, influent chamber 30, and oil holding chamber 34 during operation of separator apparatus 20.

In the preferred embodiment, the height at which effluent pipe 74 passes through the wall of tank 22 is such that approximately seventy-five percent (75%) of the total volume of tank 22 is therebelow. Similarly, the height at which influent pipe 68 passes through the wall of tank 22 is preferably chosen so that approximately eighty percent (80%) of the total volume of tank 22 is therebelow. It shall be understood that these percentages may be adjusted in accordance with the particular liquids being separated and to accommodate a desired volume of accumulated separated liquid at the surface within separator chamber 28, influent chamber 30, and oil holding chamber 34. In fact, if sedimentation within influent pipe 68 is not a problem in a given application of the present invention, and provided that sufficient hydraulic gradient exists from the influent source to the final destination of the effluent so as to cause flow through separator apparatus 20, the height at which influent pipe 68 passes through the wall of tank 22 will not be critical, as will now be understood by those skilled in the art.

For reasons that will become apparent in the discussion below of the dynamic operation of surge control means 52, influent chamber 30, oil holding chamber 34, and effluent chamber 38 are all preferably chosen to have substantially equal volumes, each equal to the volume that will hold one minute's or more flow of the design goal volume flow rate Q in cubic feet per second, i.e., 60 Q feet$^3$. In practice, these volumes will each be approximately ten percent (10%) of the total volume of tank 22, leaving approximately seventy percent (70%) of the volume for separator chamber 28, and will be large enough for a service person to enter through access hatches 46, 48, and 50.

It should be understood that these percentages may vary, depending on the particular application, and have been chosen for a separator tank 22 having a length to diameter ratio of four. Other such ratios could be provided, constrained by size requirements of the finished apparatus or by structural limitations of tank 22. For instance, influent chamber 30, if enlarged, would, for a given volume flow rate through separator apparatus 20, retain the oil-water mixture therein for a greater time, thereby allowing solids, sludge, and sediment to settle to the bottom of influent chamber 30 for later removal. Such an enlarged influent chamber 30 might be required in those applications where substantial solids, sludge, and/or sediment are present in the incoming oil-water influent. Or, effluent chamber 38 may be enlarged for those applications where secondary effluent treatment, such as bulky filtering equipment and the like, is to be provided therewithin.

Upon installation, separator apparatus 20 is then preferably filled with water to the level of outlet 26. Initially, in the static resting state, with no oil-water mixture M flowing through separator apparatus 20, the fluid levels of the various chambers within tank 22 will be, as previously described, at heights $h_2$ and $h_3$, each approximately even with the lower point of outlet 26 in this initial resting state. As liquid begins to enter separator apparatus 20 through influent pipe 68, the liquid level within separator chamber 28 begins to rise due to the resistance provided by surge control means 52 to fluid flow therethrough. In the preferred embodiment, surge control means 52 comprises a pipe 78 connecting separator chamber 28 to effluent chamber 38, allowing the passage of purified water from separator chamber 28 to effluent chamber 38 through pipe 78 in a manner that will now be understood. Pipe 78 extends through bulkheads 36 and 40, and is circumferentially sealed thereto using sealing means well-known to those skilled in the art such as welds 80 and 82 where pipe 78 respectively passes through bulkheads 36 and 40. Pipe 78 will be understood to have an inner diameter $D_T$ defining a longitudinal passageway 84 through pipe 78, and pipe 78 further has an end-to-end length of $L_T$ from end 86 with effluent chamber 38 to end 88 within separator chamber 28.

As liquid enters and leaves each of the chambers 38, 34, 28, and 30, each chamber will obey the rules of conservation of mass such that the difference in volume flow rates in and out will produce an accumulated volume of liquid within each chamber, causing the liquid level within each chamber to rise in a manner well-known to those skilled in the art. For instance, as the liquid level within effluent chamber 38 rises above the height of outlet 26, effluent water will exit tank 22 through effluent pipe 74. Similarly, as oil-water mixture M enters influent chamber 30, and surge control means 52 offers resistance to the movement of liquid therethrough, the surface height of mixture M within chambers 34, 28, and 30 will rise as the volume of mixture M therein increases. Because of the relatively vast internal volume of tank 22 occupied by chambers 34, 28, and 30, typically ninety percent (90%) of tank 22, the rise in height of mixture M therein will be rather slow, and any sudden surges and accelerations in the flow of mixture M are absorbed, in a manner that will now be understood, as surge control means 52 regulates the flow out of separator chamber 28.

The inner diameter $D_T$ of pipe 78 is chosen to be in proportion to and preferably equal to the inner diameter $D_I$ of influent and effluent pipes 68 and 74, respectively. It shall be understood that inner diameter $D_T$ of pipe 78 is a compromise, being small enough to offer resistance to water flowing through pipe 78, yet large enough so that the fluid level within tank 22 upstream of surge control means 52 does not rise substantially above inlet 24. For reasons as will be explained in detail hereinbelow, the fluid at the height of end 88 and entering passageway 84 therethrough will be substantially free of oil particles. The downwardly acutely angled opening 90 at end 88 of pipe 78 causes the flow of water into pipe 78 to be as shown by stream lines 92, thereby substantially reducing any downward flow by oil particles above pipe 78 thereinto because most of the fluid entering pipe 78 will be from regions therebelow. Furthermore, in the preferred embodiment, end 88 of pipe 78 will preferably extend a distance of at least 1.5 times inner diameter $D_T$ of pipe 78 into separator chamber 28 as shown so that swirling boundary effects and eddies where flowing oil-water mixture M impacts baffle 36 as shown by stream lines 94 will not be seen at opening 90.

The length $L_T$ of pipe 78 from end 86 to end 88 should be chosen to be between three and six times inner diameter $D_T$ so that entrance effects within pipe 78 from opening 90 will have subsided by the time water exits end 86 and so that the flow through pipe 78 will have assumed a substantially symmetric cylindrical shape. While pipe 78 could be longer and extend substantially further than shown into separator chamber 28, such an extension could tend to draw into pipe 78 oil particles that have not yet risen a sufficient distance above opening 90 in a manner explained hereinbelow.

The volume flow rate $Q_T$ through pipe 78 will be understood to conform to Bernoulli's equation such that the flow rate can be expressed as $$Q_T = C_T A_T \sqrt{2G\Delta H_T}$$

where $A_T$ is the cross-sectional area of passageway 84 through pipe 78; $\Delta H_T$ is the hydraulic gradient seen across pipe 78; G is the gravitational acceleration constant as before; and $C_T$ is the loss coefficient of discharge through pipe 78 into effluent chamber 38, it being understood that $C_T$ represents such losses as frictional, inlet, and exit losses of pipe 78 and can be readily determined in a manner well-known to those skilled in the art.

Now that the various volume flow rates through separator apparatus 20 are understood to be controlled and constrained, an explanation of the operation of separator chamber 28 and oil holding chamber 34 will now be given. Referring to FIGS. 1–5, separator apparatus 20 comprises a baffle or bulkhead 32 at the entrance 96 to separator chamber 28 and interposed between separator chamber 28 and inlet 24, and another baffle or bulkhead 36 at one exit 98 from separator chamber 28 and interposed between separator chamber 28 and oil holding chamber 34, it being understood that separator chamber 28 additionally has another exit path through surge control means 52 as previously described.

All flow of oil-water mixture M must pass through a first gate means 100 for preventing the flow into separator chamber 28 of any of oil-water mixture M below a first gate height $h_4$ above the bottom of tank 22. In the preferred embodiment, first gate means 100 is an opening 102 in bulkhead 32 at entrance 96, with the lower surface of opening 102 forming a weir 104 at first gate height $h_4$ above the bottom of tank $h_4$. It will now be understood, because weir 104 is at height $h_4$, that it is impossible for oil particles to enter the entrance to separator chamber 28 below height $h_4$ and therefore, at entrance 96, all oil particles will be at least a height $h_4$ above the bottom of tank 22. It will be understood that the slow flow of oil-water mixture M past weir 104 will cause a slight downward movement of oil particles flowing thereover as the particles follow the stream lines of the flowing mixture, but, providing the velocity of mixture M is not great, the particles will not move substantially below height $h_4$. Additionally, weir 104 acts as a sludge baffle, trapping sludge and sediment that has settled to the bottom of influent chamber 30 within chamber 30 for later scheduled removal, thereby preventing the flow into separator chamber 28 of sediment below height $h_4$.

Similarly, interposed between separator chamber 28 and oil holding chamber 34 at exit 98 is a second gate means 106 for preventing the recirculation of oil particles, which have moved therepast into oil holding chamber 34, back into separator chamber 28 below a second gate height $h_5$ above the bottom of tank 22, it being understood that first gate height $h_4$ is lower than second gate height $h_5$. In the preferred embodiment, second gate means 106 is an opening 108 in bulkhead 36 at exit 98, with the lower surface of opening 108 forming a weir 110 at second gate height $h_5$ above the bottom of tank 22. A portion of bulkhead 36 below weir 110 may also be used as a structural support for pipe 78 as shown. It will now be understood, because weir 110 is at height $h_5$, that all oil particles within oil-water mixture M of height $h_5$ or above will flow into oil holding chamber 34 in a manner hereinafter described. In the preferred embodiment, $h_4$ is chosen so that approximately twenty-eight percent (28%) of the volume of tank 22 is therebelow. Similarly, $h_5$ is preferably chosen so that fifty-eight to fifty-nine percent (58% to 59%), i.e., approximately sixty percent (60%) of the volume of tank 22 is therebelow. These percentages may be varied depending on the particular application and the desired oil storage volume at the oil-water surface within tank 22.

A sphere, such as an oil particle, buoyantly rising in a viscous quiescent fluid, such as oil-water mixture M, reaches a terminal rising velocity $v_T$ at which the viscous retarding force, given by Stokes' law, plus the buoyant force equals the weight of the sphere. In other words, $$\tfrac{4}{3}\pi r^3 \rho_W G + 6\pi \eta r v_T = \tfrac{4}{3}\pi r^3 \rho_O G$$

or, $$v_T = \tfrac{2}{9}\ \frac{r^2 G}{\eta}\ (\rho_O - \rho_W),$$

where, as before, r is the radius of the oil particle; $\rho_O$ and $\rho_W$ are the densities of oil and water, respectively; $\eta$ is the viscosity of water; and G is the well-known gravitational acceleration constant. Furthermore, if the Reynolds rise number $R_O$ of the oil particle is greater than 0.1, the drag force on the oil particle will be underpredicted and the oil particle will rise more slowly than expected.

As shown in FIG. 11, rising oil particles $O_1$ and $O_2$ being carried with the slowly moving flow of oil-water mixture M will follow upwardly rising curved paths 112 and 114, respectively. Oil particles having a diameter of twenty microns have been experimentally calculated moving through the present invention at an upward rise velocity of at least 0.0125 feet per second (0.15 inches per second). The flow path length $L_C$ through separator chamber 28 from first gate means 100 to second gate means 106, as indicated by sequential flow lines 116a, 116b, 116c, 116d, and 116e, is chosen to be of sufficient length so that an oil particle of a given diameter, such as twenty microns, will rise from its entry height $h_4$ into separator chamber 28 to a final height of at least $h_5$ upon its exit into oil holding chamber 34. By reference to the above equation for the upward terminal velocity $v_T$, which, although overestimating the actual velocity still can be used to compare the velocities for variously-sized oil particles, it will be understood that oil particles greater than this given diameter will rise more quickly toward the upper surface of oil-water mixture M. Therefore, once a given flow path length through separator chamber 28 is fixed by the rise velocity of a chosen diameter oil particle, all oil particles of that diameter or greater will be above height $h_5$ upon reaching second gate means 106

The time $t_C$ any given oil particle has in which to rise from height $h_4$ to $h_5$ will depend upon the velocity of oil-water mixture M through separator chamber 28 from first gate means 100 to second gate means 106. Oil-water mixture M flows through horizontal channel 118 formed within separator chamber 28 as by vertical plates 120, 122, 124, and 126 extending longitudinally from bulkheads 32 and 36 into chamber 28 and extending upwardly from the bottom of tank 22, preferably sealed thereto by means, such as welding, well-known to those skilled in the art. In the preferred embodiment, horizontal channel 118, hereinafter described in great detail, winds a serpentine path of length $L_C$ from first gate means 100 to second gate means 106. Defining $Q_C$ as the volume flow rate, in cubic feet per minute, through horizontal channel 118 of oil-water mixture M; $A_C$ as the transverse cross-sectional area of channel 118; and $v_C$ as the velocity, in feet per second, of oil-water mixture M through channel 118, it is understood that $$Q_C = A_C v_C,$$

or, equivalently, that $$v_C = \frac{Q_C}{A_C} = \frac{Q_C}{WH},$$

where W is the channel width and H is the channel height. The transit time $t_C$ any particular oil particle actually has to rise vertically while moving through horizontal channel 118 is $$t_C = \frac{L_C}{v_C},$$

while the time $t_R$ required by an oil particle rising at an actual rise velocity $V_R$, experimentally calculated to be 0.15 inches per second (somewhat slower than the calculated upward terminal velocity $v_T$, because of the underpredicted drag forces, the exact figure depending on the particle size), to move the vertical distance from weir 104 to weir 110 is $$t_R = \frac{h_5 - h_4}{v_R}.$$

It will now be understood that, provided $t_C$ is not less than $t_R$, all oil particles entering at first gate height $h_4$ will be at least as high as second gate height $h_5$ after travelling flow path length $L_C$ through channel 118. And, because $L_C$, $h_4$, $h_5$, and $v_R$ are fixed physical quantities, it is now understood that, by constraining the velocity $v_C$ of oil-water mixture M through channel 118 to be less than a certain maximum flow velocity $v_M$ where $$v_M = \frac{L_C v_R}{h_5 - h_4}$$

that all oil particles reaching second gate means 106 will be above weir 110 and will pass into oil holding chamber 34. It shall also be now understood that, since $v_C$ times $A_C$ equals $Q_C$, constraining the volume flow rate $Q_C$ through channel 118 thereby constrains $v_C$. In the preferred embodiment, the flow velocity $v_C$ is constrained to be less than 0.5 feet per second. By a simple manipulation of the above equations, if the volume flow rate $Q_C$ through separator chamber 28 (and thereby, through separator apparatus 20 as well) is specified, the flow path length $L_C$ of separator chamber 28 will therefore be required to be at least $$L_C = \frac{(h_5 - h_4) Q_C}{A_C v_R}.$$

As now hereinafter discussed, separator apparatus 20 is able to perform well even as oil accumulates on the surface of oil-water mixture M within tank 22, thereby still removing particles of a given minimum size and terminal rise velocity. For a particle of a given diameter to rise from the bottom of a channel of height H to its top, the rise velocity $v_R$ must be at least $$v_R = \frac{H}{t_C},$$

where $t_C$ is the transit time the particle spends within the channel flowing with oil-water mixture M from one end of the channel to the other. As separator 20 accumulates oil at the upper surface of oil-water mixture M (i.e., at the top of the channel), the channel cross-sectional area $A_C$ becomes a fraction of its initial area due to the reduction in the channel height by a fraction $\alpha$, from a height of H to H′=$\alpha$H, while the channel length $L_C$ and width W remain unchanged. Hence, $$A_C' = WH' = \alpha WH.$$

For the same given volume flow rate $Q_C$ flowing through the channel, the flow velocity $v_C$ of oil-water mixture M through the channel is seen to then increase to $$v_C' = \frac{Q_C}{A_C'} = \frac{Q_C}{\alpha WH} = \frac{v_C}{\alpha}.$$

The time the oil particle spends flowing with oil-water mixture M through the reduced channel below the accumulated oil at the surface above then becomes $$t_C' = \frac{L_C}{v_C'} = \alpha \frac{L_C}{v_C} = \alpha t_C.$$

Therefore, for an oil particle to rise to the oil-water interface, the particle must have a minimum diameter that produces an upward rise terminal velocity of $$v_R' = \frac{\alpha H}{\alpha t_c} = \frac{H}{t_c} = v_R$$

Or, in other words, the required rise velocity, and therefore the minimum oil particle size that can be removed, at a given volume flow rate $Q_C$ is substantially independent of the amount of oil accumulated at the upper surface of the oil-water mixture M within the separator apparatus.

In order for oil-water mixture M to flow into oil holding chamber 34, conservation of mass requires that an equivalent volume flow out of chamber 34. For this purpose, return path means 128 is provided for allowing the flow of fluid from a bottom portion of oil holding chamber 34 back to separator chamber 28 upstream of second gate means 106 (i.e., upstream of entrance or opening 108). Referring to FIGS. 2 and 5, in the preferred embodiment, return path means 128 is a relief port 130 through bulkhead 36 near the bottom of oil holding chamber 34, allowing the pure water at the bottom of oil holding chamber 34 to flow therefrom back into separator chamber 28. Relief port 130 should be sized so that the expected volume of fluid, i.e., relatively pure water, passing therethrough back into separator chamber 28 equals the expected volume of oil passing into oil holding chamber 34 through second gate means 106.

Oil holding chamber 34 serves three purposes in the present invention. First, it allows oil to flow into a location from which the oil can be pumped, as at regular maintenance intervals, and inhibits the recirculation of collected oil back into separator chamber 28 below height $h_5$ of weir 110. It will be understood that, once an oil particle enters oil holding chamber 34 over weir 110, the oil particle can now take as long as required to rise to the surface of the oil-water mixture within oil holding chamber 34. If the present invention were to be used in a continuous-flow operation, oil holding chamber 34 could be provided with an outlet or discharge pipe connected to an oil pump, and oil could be pumped therefrom without disrupting the operation of separator chamber 28 or causing turbulence therein. Second, second gate means 106 allows oil particles to slide thereover and therethrough, and thereby contains the regions where the turbulent boundary effects of the flow of oil-water mixture M impacting upon a flat surface will be seen to be, within oil holding chamber 34. For example, it will now be apparent to those skilled in the art that certain swirling turbulence will be present within oil holding chamber 34 at the interior sides thereof, as for instance, where oil-water mixture M impinges upon bulkhead 40. Were oil holding chamber 34 not present, i.e., were opening 108 thereinto closed, these swirling turbulent effects would additionally be seen at bulkhead 36, thereby increasing the turbulence of stream lines 94. Third, it will be understood that oil-water mixture M, at opening 90 into pipe 78, will vary from substantially clean water near the bottom of tank 22, to a region, consisting substantially of oil only, at the upper surface of mixture M, with a transition zone, between these two regions of oil only and water only, of water mixed with rising oil particles. Were oil holding chamber 34 not present, the swirling turbulence of flowing oil-water mixture M impacting on bulkhead 36 would tend to expand the transition zone of oil particles downward toward the entrance 90 into pipe 78, thereby lowering the purity of the water passing therethrough.

In order for the preceding results concerning the various rise velocities of oil particles to be true, Stokes' law must apply, or at least be a reasonable approximation. Stokes' law, as previously noted, is only strictly applicable in a quiescent and non-moving fluid, and is a reasonable approximation only in a "creeping flow." Stokes' law is also rendered completely useless if the flow is substantially turbulent, i.e., non-laminar, because oil particle movement would then become dominated by turbulent forces and not the natural buoyancy of the particles. As noted before, a measure of the turbulence within a channel of flowing fluid, such as channel 118 with oil-water mixture M flowing therethrough, is given by the Reynolds number $R_C$ for the channel, defined by the well-known relationship $$R_C = \frac{\rho w_{AV} D_H}{\eta}$$

where $D_H$ is the well-known "hydraulic diameter" of the channel and $v_{AV}$ is the average velocity of the fluid through the channel. If $R_C$ is less than 2,000, the flow is completely laminar and non-turbulent. If $R_C$ is greater than 10,000, the flow is completely turbulent and non-laminar. As $R_C$ moves between these values, the flow goes from being completely laminar to completely turbulent.

In order for the turbulence within channel 118 to be substantially eliminated, the Reynolds number $R_C$ for channel 118 should be constrained to be as low as possible. Referring now to FIGS. 9 and 10, the theory of this aspect of the present invention can now be explained.

An arbitrary full channel, such as channel 134 shown in FIG. 9, having a height H and a width W, respectively indicated by reference numerals 136 and 138, through which a liquid flows will have a hydraulic diameter $D_H$ given by the well-known relationship $$D_H = \frac{4A_C}{P_C},$$

where $A_C$ is the transverse cross-sectional "wetted area" of the moving liquid and $P_C$ is the well-known "wetted perimeter" distance of the channel. For the relatively tall and thin channel 134, it is seen that $$> W$$

and $$A_C = HW$$

and $$P_C = 2(H + W)$$

so that $$D_H = \frac{4HW}{2(H + W)} \approx 2W.$$

Subdividing channel 134 into N smaller subchannels as by infinitely thin vertical plates 140 to produce divided channel 134a a shown in FIG. 10, each subchannel will be seen to have a width $W_S$ such that $$W_S = \frac{W}{N}$$

thereby reducing the cross-sectional area of each subchannel by a divisor factor of N while only slightly reducing the wetted perimeter of each subchannel, all as compared to original undivided channel 134.

Because $$H > W > W_S,$$

the hydraulic diameter $D_{HS}$ for each subchannel is now seen to be $$D_{HS} = \frac{4HW_S}{2(H + W_S)} = \frac{4HW}{2N(H + W_S)} \approx \frac{2W}{N} \approx \frac{D_H}{N},$$

thereby reducing the Reynolds number $R_C$ by approximately this same divisor factor of N in a manner that will now be apparent.

Noting that $$v_{AV} = \frac{Q}{A_C}, \text{ and}$$

$$D_H = \frac{4A_C}{P_C}, \text{ it is seen that}$$

$$R_C = \frac{\rho w_{AV} D_H}{\eta} = \frac{4\rho w Q}{\eta P_C} = \frac{2\rho w Q}{(H + W)\eta}$$

while $R_{SC}$, the Reynolds number for each subchannel, is given by $$R_{SC} = \frac{4\rho WQ}{\eta N P_{SC}} \approx \frac{R_C}{N},$$

where $P_{SC}$ is the wetted perimeter distance of the subchannel.

As oil begins accumulating in the top part of channel 134, the working height H available for the flowing fluid is reduced such that the new channel height is $\alpha H$, where $$0 < \alpha < 1$$

and hence the new velocity through channel 134 becomes $$v_{AV}' = \frac{Q}{\alpha HW} = \frac{v_{AV}}{\alpha} > v_{AV}.$$

Furthermore, the hydraulic diameter $D_H$ becomes $$D_H' = \frac{2\alpha HW}{\alpha H + W}$$

and, by substitution of these quantities into the prior equations, the Reynolds number $R_C$ becomes $$R_C' = \frac{2\rho WQ}{(\alpha H + W)\eta} \approx \frac{2\rho WQ}{\alpha H \eta} \approx \frac{R_C}{\alpha} > R_C$$

for values of $\alpha$, H, and W such that $$\alpha H > W.$$

In other words, as oil accumulates on the surface of fluid flowing through channel 134, the Reynolds number of the channel increases linearly therewith, indicating greater turbulence therein. Similar results can be shown for each subchannel in FIG. 10.

The practical application of this theory can be seen by a examination of FIGS. 2 and 4. Horizontal channel 118 comprises a sequence of serially joined channel portions 142, 144, 146, 148, and 150, winding a serpentine path from weir 104 to weir 110. As previously mentioned, horizontal channel 118 is formed within separator chamber 28 by vertical plates 120, 122, 124, and 126 extending longitudinally from bulkheads 32 and 36 into chamber 28 and extending upwardly from the bottom of tank 22, preferably sealed thereto by means, such as welding, well-known to those skilled in the art. Plates 120, 122, 124, and 126 need not extend all the way to the top of tank 22, but may be spaced a short distance therefrom as shown for ease of manufacture, it being understood that the surface of oil-water mixture M does not typically reach to the top of tank 22, thereby precluding the flow of oil-water mixture M over the tops of plates 120, 122, 124, and 126. Even if oil-water mixture M were to flow over the tops of these plates, no substantial impairment of operation would result because the surface of oil-water mixture M is where the oil within separator apparatus 20 collects, and such a flow would merely pass surface oil from one portion of separator chamber 28 to another, with no effect on the purer water therebeneath.

In the preferred embodiment, the transverse cross-sectional area of each of channel portions 142, 144, 146, 148, and 150, is chosen to be equal so that the velocity $v_C$ of oil-water mixture M through each is the same, as is now understood from the previous formulaic derivations. It shall be additionally understood that the various plate spacings shown in FIGS. 2 and 4 are somewhat exaggerated for purposes of illustration, but are intended to indicate that the transverse cross-sectional area of each channel portion is substantially the same.

In accordance with the previously disclosed theory of the present invention, the turbulence within the various channel portions is controlled by controlling the Reynolds numbers of those channel portions. A discussion of channel portion 144 will be used for illustrative purposes, it being understood that channel portions 146 and 148 are similarly constructed.

In order to control the Reynolds number of channel portion 144, a plurality of horizontally-spaced parallel vertical plates, such as plates 152 and 154, subdivide channel portion 144 in to a number of subchannels 156, each preferably of the same transverse cross-sectional area. Plates 152 and 154 are seen to extend longitudinally for substantially the entire length of channel portion 144 and to extend vertically from a lower point near the bottom of tank 22 to a higher point near the top of tank 22. Plates 152 and 154 are horizontally spaced apart and supported from each other and from plates 120 and 122 by means, such as struts or braces, not shown, well known to those skilled in the art. While plates 152 and 154 could extend the entire distance from the bottom of tank 22 to the top of tank 22, in the preferred embodiment they do not, for ease of manufacture. The discussion above about the flow of surface oil over the tops of plates 120 and 122 applies equally here. Additionally, the water at the bottom of tank 22 is rather pure and slow moving; the slight migration of water between the bottoms of subchannels 156 will not substantially disturb the upward rise of oil particles thereabove.

The number N of subchannels 156 within each channel portion, as well as the subchannel width or plate spacing $W_{SC}$ should be chosen in accordance with the theory of the present invention so that the Reynolds number $R_{SC}$ for each subchannel is less than 10,000 and more advantageously less than 4,000, thereby ensuring low turbulence and laminar flow within the subchannels 156. Experimental testing has verified these preferred choices for the Reynolds numbers of the subchannels. Furthermore, the performance, i.e., purity of effluent water emerging from outlet 26, of separator apparatus 20 has been experimentally observed to not degrade significantly as oil accumulates at the surface of oil-water mixture M, thereby decreasing the effective channel height to $\alpha H$, until the surface oil reaches downwardly to weir 110, i.e., when the effective channel height is only $h_2$, or therebelow. Therefore, for acceptable performance under conditions of substantial accumulated surface oil within tank 22, the subchannel width or plate spacing $W_{SC}$ as well as the number N of subchannels 156 should be set so that, when the level of accumulated surface oil reaches weir 110, $R_{SC}$ will be less than or equal to 10,000 to minimize the turbulence within channel 118.

However, the subchannel width or plate spacing $W_{SC}$ should also be chosen with awareness of the particular application to which separator apparatus 20 will be put. For instance, if a heavy, viscous oil were to be separated from water, excessively narrow channels would become clogged with grease. In such an application, a higher Reynolds number for the subchannels might have to be chosen, perhaps close to 10,000, to avoid channel clogging. It should be noted, however, that many greases are easier than small oil particles to remove from water because thick grease doesn't have a tendency to break into small particles and therefore will tend to rise readily to the surface of the water.

It shall be understood that channel portions 142 and 150 could be subdivided by horizontally-spaced parallel vertical plates in a manner similar to channel portions 144, 146, and 148, for similar control of the Reynolds numbers of channel portions 142 and 150, thereby controlling the turbulence therein. Such parallel vertical plates are omitted in the preferred embodiment for ease of manufacture, and their lack may be compensated for by a slight reduction in the flow velocity through horizontal channel 118 in a manner that will now be apparent to those skilled in the art for increased transit time of oil bubbles through separator chamber 28, as previously described. Were the transverse cross-section of tank 22 to be rectangular, not circular as in the preferred embodiment, channel portions 142 and 150 could easily be subdivided without substantial difficulty of manufacture, in a manner that will now be apparent.

Although two unsubdivided channel portions 142, 150, and three subdivided channel portions 144, 146, 148 are shown in the preferred embodiment, it shall also be understood that the numerosity of either may be greater or lesser. For example, tank 22 could be more elongated with a single subdivided channel portion therethrough, or it could be less elongated with a more serpentine path of horizontal channel 118 therein. The essential requirement is that sufficient transit time be allowed for oil particles to rise in a manner previously described.

An additional enhancement to the oil removal mechanism is also provided by the use of laminar flow within the subchannels 156 of the present invention. All previous discussions of velocity within separator apparatus 20 shall be understood to refer to the average fluid velocity taken across a transverse plane to the direction of flow. In actuality, the velocities at different points throughout this transverse plane will not be equal to this average. Referring to FIG. 12, a top view of a typical subchannel 156, as between plates 152 and 154, is shown, with two oil particles, $O_1$ and $O_2$, moving therethrough on respective paths 112 and 114. Oil particles $O_1$ and $O_2$ are each defined to have a radius r and are respectively defined to be at distances $x_1$ and $x_2$ from wall 152. The width of channel 156 is here, for purposes of discussion, defined to be some distance h.

A channel with a low Reynolds number and a laminar, non-turbulent flow will have a parabolic-shaped longitudinal velocity profile curve 158 as shown in FIG. 13, taken across the transverse channel line 13—13 shown in FIG. 12, with the longitudinal fluid velocity being shown to vary from substantially zero at the subchannel walls 152, 154, to a maximum at the center of the channel, one-half h. In contrast, a channel having a higher Reynolds number will have a flatter velocity profile curve 160 with steep velocity gradients 162 at the walls, and very little velocity gradient within the center of the subchannel.

Because each oil particle has a finite diameter and a substantial longitudinal velocity gradient 164 and 164, exists within subchannel 156 at all places except near the center of the channel where the velocity profile curve is sloped rather horizontally, opposite ends of a diameter of each particle taken transverse to the channel will see different forward velocities. In other words, at $x_1 \pm r$, the "left" and "right" sides of $O_1$, oil particle $O_1$ will experience velocities of $v_{1L}$ and $v_{1R}$. Similarly, at $x_2 \pm r$, the "left" and "right" sides of $O_2$, oil particle $O_2$ will experience velocities of $v_{2L}$ and $v_{2R}$. This difference in velocities felt by the opposite sides of the oil particles will cause them to spin, much like a "curve ball," toward the nearest wall in a manner now understood because the well-known "stagnation point" is not aligned with the longitudinal direction of forward motion.

This spinning of the oil particles has two beneficial effects. As noted above, smaller oil particles tend to rise more slowly than larger oil particles. The first advantage is that, as the oil particles move toward the walls, they move from regions of non-zero forward longitudinal velocity to regions of near-zero forward longitudinal velocity. If the particles then move more slowly from first gate means 100 to second gate means 106, they will have a longer transit time through the length of channel 118, thereby ensuring that more particles, whatever their size, have risen a sufficient vertical distance during their passage.

The second advantage is that, as smaller particles move to regions of near-zero forward velocity near the subchannel walls, they tend to agglomerate at the walls into larger particles and then rise more quickly to the surface. These beneficial effects would not be as pronounced were the Reynolds numbers within the various subchannels not controlled as in accordance with the present invention.

It should be noted that the serpentine path followed by channel 118 and its serial sequence of joined channel portions 144, 146, and 148 has another advantage. Any oil particle traveling down the exact center of a subchannel 156 will not experience a velocity gradient at its opposite sides, and will therefore not have a tendency to spin toward the walls of subchannel 156. Similarly, any oil particles substantially near the channel center will have only slight spinning tendencies. However, at each turn from one joined channel portion to the next, as shown by flow lines 116b and 116c, the channel flow will become perturbed and there will be a very low probability that an oil particle traveling near the subchannel center in one channel portion will be traveling down the subchannel center in the next. It will now be apparent that substantially every oil particle will experience a velocity gradient in at least one of the sequentially joined channel portions of horizontal channel 118.

Referring now to FIGS. 1, 2, 6, and 7, the details may be seen of vertical rising unit means 166, interposed between separator chamber 28 and outlet 26, for guiding fluid, passing from separator chamber 28 to outlet 26, upwardly before the fluid flows to outlet 26. In the preferred embodiment, vertical rising unit means 166 is a vertical rectangular box 168 having a closed bottom end 170 and an open top end 172, with closed bottom end 170 receiving the flow through surge control means 52 as from end 86 of pipe 78. Box 168 is preferably attached as by bolting or welding, to bulkhead 40 within effluent chamber 38. The horizontal transverse internal cross-sectional area of box 168 is preferably chosen to be four times the internal cross-sectional area $A_T$ of pipe 78.

When oil particles emerge from end 86 of pipe 78, they will be understood to be of buoyancy close to that of water, or else are so small that they have become a stable emulsion. Were the particles significantly more buoyant, they would have risen above entrance 90 and would not have escaped into pipe 78. By forcing these small particles upward, they will then tend to stratify upon the surface above because, once forced upward, they will tend to not go downward due to their marginal buoyancy difference with respect to the surrounding flowing water.

In some applications, it may be desired to remove chemicals such as benzene from the effluent emerging from end 86 of pipe 78. In such a case, rectangular box 168 may be fitted with a filter, such as a charcoal filter 176, preferably of the well-known replaceable cartridge type, in a manner now apparent.

In other applications, an alternate embodiment 166' of the vertical rising unit means shown in FIGS. 15 and 16 may be utilized. Embodiment 166' differs from embodiment 166 in that means 166' has a spaced plurality of parallel vertical plates 178 subdividing the channel 180 through means 166' into a plurality of subchannels 182. Additional vertical plates, not shown, could also be provided extending parallel to bulkhead 40, to subdivide channel 180 into still smaller subchannels in a manner that will now be apparent in order to further reduce the Reynolds numbers of the subchannels. The operation of subchannels 182 is similar to that of subchannels 156 in separator chamber 28, except, because the flow is vertical rather than horizontal therethrough, only the spinning effect on the oil particles, as well as the controlled turbulence due to the reduced Reynolds numbers, is employed. Furthermore, because the larger oil particles have already been removed from the effluent by separator chamber 28, the danger of clogging of subchannels 182 will be lessened. It shall be understood that plates 178 may be constructed as a replaceable cartridge, interchangeable with the aforementioned filter cartridge, so that a single construction of box 168 may house either a filter cartridge, subdivided channels 182, or be completely open therethrough depending on the particular application.

For ease of manufacture, the internals of tank 22, i.e., all the plates and bulkheads therein, together with surge control means 52 and vertical rising unit means 166, may be fully constructed externally as a one-piece cartridge as by welding in a manner well-known to those skilled in the art using various jigs or fixtures. This cartridge may then be slid into tank 22 while one end is still open, secured as by welding or bolting to the interior of tank 22 as by workers entering the various chambers through access hatches 46, 48, and 50, and finally the end of tank 22 can be secured, as by welding or bolting, in a manner well-known to those skilled in the art.

Referring now to FIGS. 18-21, an alternate embodiment of the vertical riser unit is shown, with similar reference numerals being used for similar elements as those previously given, but with the prefix "2." for clarity to indicate the alternate embodiment. For ease of access, vertical rectangular box 2.168 of vertical rising unit means 2.166 is shown positioned in line with access hatch 46, and is constructed as a removable cartridge. Box 2.168 sits atop a connecting duct 200 having a first end 202 into which end 86 of pipe 78 empties, first end 202 being understood to be otherwise closed. The bottom 203 of box 2.168 is understood to sealingly mate with flange 204 around upwardly-facing opening 206 in second end 208 of duct 200, and to rest thereagainst. If desired, slides 210 may be provided on bulkhead 40 for receiving flanges 212 on either side of box 2.168, thereby allowing box 2.168 to be easily installed and removed as a cartridge unit through access hatch 46 in a manner that will now be apparent. In many applications, it will be understood that the weight of box 2.168 and the sealing of bottom 203 with flange 204 will provide sufficient means to hold box 2.168 atop duct 200 without slides 21? being required. Duct 200 will act to channel the flow of purified water emerging from end 86 of pipe 78 to riser box 2.168. While the separate replaceable cartridge nature of box 2.168 shall be understood to not be required for proper functioning of separator apparatus 20, such a construction provides an easy means for adding and replacing filters through access hatch 46 after separator apparatus 20 has been buried underground. It shall be understood that box 2.168 may contain the various filters and/or plates internally as previously heretofore described as embodiments of the vertical rising unit means.

Referring now to FIG. 17, a simplified embodiment 20' of the present invention is shown, having no gate means, surge control means, or vertical rising unit means, as well as having no horizontally-spaced plates subdividing the horizontal channel into parallel subchannels. This figure is shown to emphasize the basic underlying principle behind the present invention. As before, tank 22' has an influent pipe 68, an effluent pipe 74, a separator chamber 28', and a serpentine horizontal channel 118' having a flow path length $L_C$ through separator chamber 28' from influent pipe 68 to effluent pipe 74. As before, horizontal channel 118' is formed by horizontally-spaced vertical plates 120, 122, 124, and 126, preferably spaced apart, one from another, so that each channel portion 142, 144', 146', 148', and 150 has substantially the same transverse cross-sectional area $A_C$, thereby producing a substantially constant flow velocity $v_C$ through horizontal channel 118' for a given volume flow rate $Q_C$. As previously described, for a given maximum flow velocity of oil-water mixture M through channel 118', the flow path length of channel 118' must be at least sufficiently long so that oil particles emerging from influent pipe 68 will rise to the oil-water interface by the time they have flowed with oil-water mixture M to the entrance of effluent pipe 74. The required length of channel 118' will, as before, be determined by the minimum diameter oil particles to be removed, as this minimum diameter will fix the natural rise velocity of the oil particles within the flowing oil-water mixture M. While such a simplified version of the present invention might not perform as well as the more preferred embodiment previously described because of the omitted first and second gate means, oil holding chamber, surge control means, and parallel subchannels, in many applications, especially those lacking influent surges and lacking substantial sediment within the influent, such a simplified design may suffice.

The method of the present invention will now be understood to comprise the steps of channeling a flow of oil-water mixture into low-turbulence streams having controlled Reynolds numbers while simultaneously constraining the velocity of said oil-water mixture to be less than a certain maximum velocity; and allowing sufficient time for oil particles within the oil-water mixture to rise from a first minimum height to a second minimum height toward the surface of the mixture; then, removing the water below the risen oil particles from the flow. The method may additionally include the step of filtering the removed water to remove impurities. As previously noted in connection with the separator apparatus, oil and water are herein used merely as examples of immiscible liquids that may be separated using the method of the present invention which is equally applicable to other liquids of differing density, one from the other.

Although the present invention has been described and illustrated with respect to a preferred embodiment and a preferred use therefor, it is not to be so limited since modifications and changes can be made therein which are within the full intended scope of the invention.

We claim:

1. A separator apparatus for removing particles of a first liquid from a second liquid, said first liquid having a greater buoyancy than said second liquid and with said second liquid and said particles of said first liquid being immiscibly combined into a flowing fluid mixture, said separator apparatus having:
    (a) an inlet through which said fluid mixture enters said separator apparatus;
    (b) an outlet through which a flow of purified said second liquid exits said separator apparatus; and
    (c) a separator chamber, interposed between said inlet and said outlet, through which said fluid mixture flows horizontally while said particles rise through said fluid mixture, said separator chamber having a horizontal channel therethrough comprising a serially joined plurality of channel portions and including a plurality of horizontally-spaced parallel plates subdividing at least one portion of said horizontal channel into a number of parallel subchannels, with each said subdivided channel portion having substantially the same transverse cross-sectional area.

2. A separator apparatus for removing particles of a first liquid from a second liquid, said first liquid having a greater buoyancy than said second liquid and with said second liquid and said particles of said first liquid being immiscibly combined into a flowing fluid mixture, said separator apparatus having:
    (a) an inlet through which said fluid mixture enters said separator apparatus;
    (b) an outlet through which a flow of purified said second liquid exits said separator apparatus;
    (c) a separator chamber, interposed between said inlet and said outlet, having a serpentine horizontal channel therethrough through which said fluid mixture flows horizontally while said particles rise through said fluid mixture; and
    (d) a holding chamber downstream of said separator chamber, said holding chamber having an entrance thereinto from said separator chamber;
and said separator apparatus comprising:
    (e) return path means for allowing the flow of fluid from a bottom portion of said holding chamber back to said separator chamber upstream of said entrance into said holding chamber; and
    (f) limiting means for constraining the flow of said fluid mixture to be at less than a certain maximum flow velocity through said separator chamber.

3. The separator apparatus as recited in claim 2, in which: said fluid mixture entering said separator apparatus through said inlet has sediment mixed therein, and said separator apparatus further comprises:
    (a) first gate means, interposed between said separator chamber and said inlet, for preventing the flow into said separator chamber of said sediment below a first gate height; and
    (b) second gate means, interposed between said separator chamber and said holding chamber, for preventing the flow back into said separator chamber of any of said fluid mixture within said holding chamber below a second gate height, said first gate height being lower than said second gate height.

4. A separator apparatus for removing particles of a first liquid from a second liquid, said first liquid having a greater buoyancy than said second liquid and with said second liquid and said particles of said first liquid being immiscibly combined into a flowing fluid mixture, said separator apparatus having:
    (a) an inlet through which said fluid mixture enters said separator apparatus;
    (b) an outlet through which a flow of purified said second liquid exits said separator apparatus; and
    (c) a separator chamber, interposed between said inlet and said outlet, having a serpentine horizontal channel therethrough through which said fluid mixture flows horizontally while said particles rise through said fluid mixture;
said separator apparatus including:
    (d) surge control means interposed between said separator chamber and said outlet for dampening fluctuations in the flow of said second liquid out of said separator chamber into said outlet; and said separator apparatus further having:
    (e) an effluent chamber interposed between said surge control means and said outlet, said surge control means comprising a pipe connecting said separator chamber to said effluent chamber.

5. The separator apparatus as recited in claim 4, in which said pipe has an inner diameter and a length, said length of said pipe being between three and six times said inner diameter of said pipe, and in which said pipe extends a distance of at least 1.5 times said inner diameter of said pipe into said separator chamber.

6. The separator apparatus as described in claim 5, in which the end of said pipe extending into said separator chamber has a downwardly acutely angled opening.

7. A separator apparatus for removing particles of a first liquid from a second liquid, said first liquid having a greater buoyancy than said second liquid and with said second liquid and said particles of said first liquid being immiscibly combined into a flowing fluid mixture, said separator apparatus having:
    (a) an inlet through which said fluid mixture enters said separator apparatus;
    (b) an outlet through which a flow of purified said second liquid exits said separator apparatus; and
    (c) a separator chamber, interposed between said inlet and said outlet, having a serpentine horizontal channel therethrough through which said fluid mixture flows horizontally while said particles rise through said fluid mixture;
said separator apparatus comprising:
    (d) surge control means interposed between said separator chamber and said outlet for dampening fluctuations in the flow of said second liquid out of said separator chamber into said outlet; said separator apparatus further having:
    (e) a holding chamber downstream of said separator chamber, said holding chamber having an entrance thereinto from said separator chamber;
and said separator apparatus further comprising:
    (f) return path means for allowing the flow of fluid from a bottom portion of said holding chamber back to said separator chamber upstream of said entrance into said holding chamber.

8. The separator apparatus as recited in claim 7, in which said fluid mixture entering said separator apparatus through said inlet has sediment mixed therein, and said separator apparatus further comprises:
   (a) first gate means, interposed between said separator chamber and said inlet, for preventing the flow into said separator chamber of said sediment below a first gate height; and
   (b) second gate means, interposed between said separator chamber and said holding chamber, for preventing the flow back into said separator chamber of any of said fluid mixture within said holding chamber below a second gate height, said first gate height being lower than said second gate height.

9. The separator apparatus as recited in claim 8, in which said separator apparatus further has both an influent chamber interposed between said first gate means and said inlet, and an effluent chamber interposed between said surge control means and said outlet.

10. A separator apparatus for removing particles of a first liquid from a second liquid, said first liquid having a greater buoyancy than said second liquid and with said second liquid and said particles of said first liquid being immiscibly combined into a flowing fluid mixture, said separator apparatus having:
   (a) an inlet through which said fluid mixture enters said separator apparatus;
   (b) an outlet through which a flow of purified said second liquid exits said separator apparatus; and
   (c) a separator chamber, interposed between said inlet and said outlet, having a serpentine horizontal channel therethrough through which said fluid mixture flows horizontally while said particles rise through said fluid mixture;
and said separator apparatus including;
   (d) inlet flow rate control means at said inlet for constraining the volume flow rate of the fluid mixture entering said inlet, said inlet flow rate control means comprising a tapered reducing nozzle, said reducing nozzle having an enlarged mouth spanning said inlet and having a narrowed throat downstream of said enlarged mouth, said narrowed throat being eccentrically downwardly offset with respect to said enlarged mouth of said reducing nozzle.

11. A separator apparatus for removing particles of a first liquid from a second liquid, said first liquid having a greater buoyancy than said second liquid and with said second liquid and said particles of said first liquid being immiscibly combined into a flowing fluid mixture, said separator apparatus having:
   (a) an inlet through which said fluid mixture enters said separator apparatus;
   (b) an outlet through which a flow of purified said second liquid exits said separator apparatus; and
   (c) a separator chamber, interposed between said inlet and said outlet, having a serpentine horizontal channel therethrough through which said fluid mixture flows horizontally while said particles rise through said fluid mixture;
and said separator apparatus comprising:
   (d) vertical rising unit means interposed between said separator chamber and said outlet for guiding fluid, passing from said separator chamber to said outlet, upwardly before said fluid flows to said outlet, said vertical rising unit means including a filter through which said upwardly guided fluid must pass.

12. A separator apparatus for removing particles of a first liquid from a second liquid, said first liquid having a greater buoyancy than said second liquid and with said second liquid and said particles of said first liquid being immiscibly combined into a flowing fluid mixture, said separator apparatus having:
   (a) an inlet through which said fluid mixture enters said separator apparatus;
   (b) an outlet through which a flow of purified said second liquid exits said separator apparatus; and
   (c) a separator chamber, interposed between said inlet and said outlet, having a serpentine horizontal channel therethrough through which said fluid mixture flows horizontally while said particles rise through said fluid mixture;
and said separator apparatus comprising:
   (d) vertical rising unit means interposed between said separator chamber and said outlet for guiding fluid, passing from said separator chamber to said outlet, upwardly before said fluid flows to said outlet, said vertical rising unit having a vertical channel and including a plurality of horizontally-spaced parallel plates subdividing said vertical channel into a number of parallel subchannels.

13. An oil-water separator apparatus for removing oil particles with a greater buoyancy than water from a flowing oil-water fluid mixture, said separator apparatus having:
   (a) an inlet through which said oil-water fluid mixture enters said separator apparatus, said oil-water fluid mixture entering said separator apparatus through said inlet having sediment mixed therein;
   (b) an outlet through which purified water exits said separator apparatus;
   (c) a separator chamber, interposed between said inlet and said outlet, through which said oil-water fluid mixture flows horizontally while said oil particles rise through said oil-water fluid mixture, said separator chamber having a horizontal channel therethrough and including a plurality of horizontally-spaced parallel plates subdividing a portion of said horizontal channel into a number of parallel subchannels;
   (d) an effluent chamber interposed between said separator chamber and said outlet; and
   (e) an oil holding chamber downstream of said separator chamber,
and in which said separator apparatus further comprises:
   (f) first gate means, interposed between said separator chamber and said inlet, for preventing the flow into said separator chamber of said sediment below a first gate height;
   (g) second gate means, interposed between said separator chamber and said oil holding chamber, for preventing the flow back into said separator chamber of any of said oil-water fluid mixture within said holding chamber below a second gate height, said first gate height being lower than said second gate height;
   (h) return path means for allowing the flow of fluid from a bottom portion of said oil holding chamber back to said separator chamber upstream of said second gate means;

(i) limiting means for constraining the flow of said oil-water mixture to be at less than a certain maximum flow velocity, said limiting means including:

(A) surge control means interposed between said separator chamber and said outlet for dampening fluctuations in the flow of said purified water out of said separator chamber into said outlet; and (B) inlet flow rate control means at said inlet for constraining the volume flow rate of the oil-water fluid mixture entering said inlet.

14. The separator apparatus as recited in claim 13, in which said surge control means comprises a pipe connecting said separator chamber to said effluent chamber, said pipe having an inner diameter and a length, said length of said pipe being between three and six times said inner diameter of said pipe, with said pipe extending a distance of at least 1.5 times said inner diameter of said pipe into said separator chamber, and in which the end of said pipe extending into said separator chamber has a downwardly acutely angled opening.

15. The separator apparatus as recited in claim 14, in which said inlet flow rate control means comprises a tapered reducing nozzle, said reducing nozzle having an enlarged mouth spanning said inlet and having a narrowed throat downstream of said enlarged mouth and being eccentrically downwardly offset with respect to said enlarged mouth.

16. A method of removing particles of a first liquid from a second liquid, said first liquid having a greater buoyancy than said second liquid and with said second liquid and said particles of said first liquid being immiscibly combined into a flowing fluid mixture, said method comprising the steps of:

(a) channeling said fluid mixture into a low-turbulence horizontal stream in a serpentine channel comprising a serially joined plurality of channel portions and including a plurality of horizontally spaced parallel plates subdividing at least one portion of said horizontal channel into a number of parallel subchannels having a controlled Reynolds number less than 10,000 while simultaneously constraining the velocity of said fluid mixture to be less than a certain maximum velocity; and (b) allowing sufficient time for said particles within said fluid mixture to rise from a first minimum height to a second minimum height toward the surface of said mixture; then, (c) removing said second liquid below said risen particles from said flow.

17. The method as recited in claim 16, additionally comprising the step of filtering said removed second liquid to remove impurities.

18. A separator apparatus for removing particles of a first liquid from a second liquid, said first liquid having a greater buoyancy than said second liquid and with said second liquid and said particles of said first liquid being immiscibly combined into a flowing fluid mixture, said separator apparatus having:

(a) an inlet through which said fluid mixture enters said separator;

(b) an outlet through which a flow of purified said second liquid exits said separator apparatus; and (c) a separator chamber, interposed between said inlet and said outlet, through which said fluid mixture flows horizontally while said particles rise through said fluid mixture, said separator chamber having a horizontal channel therethrough and including a plurality of horizontally-spaced parallel plates subdividing a portion of said horizontal channel into a number of parallel subchannels, said horizontal channel comprising a serially joined plurality of said subdivided channel portions with each said subdivided channel portion having substantially the same transverse cross-sectional area; and (d) a holding chamber downstream of said separator chamber, said holding chamber having an entrance thereinto from said separator chamber;

said separator apparatus further comprising:

(e) return path means for allowing the flow of fluid from a bottom portion of said holding chamber back to said separator chamber upstream of said entrance into said holding chamber; and (f) limiting means for constraining the flow of said fluid mixture to be at less than a certain maximum flow velocity through said separator chamber.

19. The separator apparatus as recited in claim 18, in which: said fluid mixture entering said separator apparatus through said inlet has sediment mixed therein, and said separator apparatus further comprises:

(a) first gate means, interposed between said separator chamber and said inlet, for preventing the flow into said separator chamber, of said sediment below a first gate height; and (b) second gate means, interposed between said separator chamber and said holding chamber, for preventing the flow back into said separator chamber of any of said fluid mixture within said holding chamber below a second gage height, said first gate height being lower than said second gate height.

20. A separator apparatus for removing particles of a first liquid from a second liquid, said first liquid having a greater buoyancy than said second liquid and with said second liquid and said particles of said first liquid being immiscibly combined into a flowing fluid mixture, said separator apparatus having:

(a) an inlet through which said fluid mixture enters said separator apparatus;

(b) an outlet through which a flow of purified said second liquid exits said separator apparatus; and (c) a separator chamber, interposed between said inlet and said outlet, through which said fluid mixture flows horizontally while said particles rise through said fluid mixture, said separator chamber having a horizontal channel therethrough and including a plurality of horizontally-spaced parallel plates subdividing a portion of said horizontal channel into a number of parallel subchannels;

said separator apparatus comprising:

(d) surge control means interposed between said separator chamber and said outlet for dampening fluctuations in the flow of said second liquid out of said separator chamber into said outlet;

said separator apparatus further having:

(e) an effluent chamber interposed between said surge control means and said outlet, said surge control means comprising a pipe connecting said separator chamber to said effluent chamber.

21. The separator apparatus as recited in claim 20, in which said pipe has an inner diameter and a length, said length of said pipe being between three and six times said inner diameter of said pipe, and in which said pipe extends a distance of at least 1.5 times said inner diameter of said pipe into said separator chamber.

22. The separator apparatus as described in claim 21, in which the end of said pipe extending into said separator chamber has a downwardly acutely angled opening.

23. A separator apparatus for removing particles of a first liquid from a second liquid, said first liquid having a greater buoyancy than said second liquid and with said second liquid and said particles of said first liquid being immiscibly combined into a flowing fluid mixture, said separator apparatus having:
  (a) an inlet through which said fluid mixture enters said separator apparatus;
  (b) an outlet through which a flow of purified said second liquid exits said separator apparatus; and
  (c) a separator chamber, interposed between said inlet and said outlet, through which said fluid mixture flows horizontally while said particles rise through said fluid mixture, said separator chamber having a horizontal channel therethrough and including a plurality of horizontally-spaced parallel plates subdividing a portion of said horizontal channel into a number of parallel subchannels;
said separator apparatus comprising:
  (d) surge control means interposed between said separator chamber and said outlet for dampening fluctuations in the flow of said second liquid out of said separator chamber into said outlet;
said separator apparatus further having:
  (e) a holding chamber downstream of said separator chamber, said holding chamber having an entrance thereinto from said separator chamber;
and said separator apparatus further comprising:
  (f) return path means for allowing the flow of fluid from a bottom portion of said holding chamber back to said separator chamber upstream of said entrance into said holding chamber.

24. The separator apparatus as recited in claim 23, in which said fluid mixture entering said separator apparatus through said inlet has sediment mixed therein, and said separator apparatus further comprises:
  (a) first gate means, interposed between said separator chamber and said inlet, for preventing the flow into said separator chamber of said sediment below a first gate height; and
  (b) second gate means, interposed between said separator chamber and said holding chamber, for preventing the flow back into said separator chamber of any of said fluid mixture within said holding chamber below a second gate height, said first gate height being lower than said second gate height.

25. The separator apparatus as recited in claim 24, in which said separator apparatus further has both an influent chamber interposed between said first gate means and said inlet, and an effluent chamber interposed between said surge control means and said outlet.

26. A separator apparatus for removing particles of a first liquid from a second liquid, said first liquid having a greater buoyancy than said second liquid and with said second liquid and said particles of said first liquid being immiscibly combined into a flowing fluid mixture, said separator apparatus having:
  (a) an inlet through which said fluid mixture enters said separator apparatus;
  (b) an outlet through which a flow of purified said second liquid exits said separator apparatus; and
  (c) a separator chamber, interposed between said inlet and said outlet, through which said fluid mixture flows horizontally while said particles rise through said fluid mixture, said separator chamber having a horizontal channel therethrough and including a plurality of horizontally-spaced parallel plates subdividing a portion of said horizontal channel into a number of parallel subchannels; and said separator apparatus including:
  (d) inlet flow rate control means at said inlet for constraining the volume flow rate of the fluid mixture entering said inlet, said inlet flow rate control means comprising a tapered reducing nozzle, said reducing nozzle having an enlarged mouth spanning said inlet and having a narrowed throat downstream of said enlarged mouth, said narrowed throat being eccentrically downwardly offset with respect to said enlarged mouth of said reducing nozzle.

27. A separator apparatus for removing particles of a first liquid from a second liquid, said first liquid having a greater buoyancy than said second liquid and with said second liquid and said particles of said first liquid being immiscibly combined into a flowing fluid mixture, said separator apparatus having:
  (a) an inlet through which said fluid mixture enters said separator apparatus;
  (b) an outlet through which a flow or purified said second liquid exits said separator apparatus; and
  (c) a separator chamber, interposed between said inlet and said outlet, through which said fluid mixture flows horizontally while said particles rise through said fluid mixture, said separator chamber having a horizontal channel therethrough and including a plurality of horizontally-spaced parallel plates subdividing a portion of said horizontal channel into a number of parallel subchannels;
and said separator apparatus comprising:
  (d) vertical rising unit means interposed between said separator chamber and said outlet for guiding fluid, passing from said separator chamber to said outlet, upwardly before said fluid flows to said outlet, said vertical rising unit means including a filter through which said upwardly guided fluid must pass.

28. A separator apparatus for removing particles of a first liquid from a second liquid, said first liquid having a greater buoyancy than said second liquid and with said second liquid and said particles of said first liquid being immiscibly combined into a flowing fluid mixture, said separator apparatus having:
  (a) an inlet through which said fluid mixture enters said separator apparatus:
  (b) an outlet through which a flow of purified said second liquid exits said separator apparatus; and
  (c) a separator chamber, interposed between said inlet and said outlet, through which said fluid mixture flows horizontally while said particles rise through said fluid mixture, said separator chamber having a horizontal channel therethrough and including a plurality of horizontally-spaced parallel plates subdividing a portion of said horizontal channel into a number of parallel subchannels;
and said separator apparatus comprising:
  (d) vertical rising unit means interposed between said separator chamber and said outlet for guiding fluid, passing from said separator chamber to said outlet, upwardly before said fluid flows to said outlet, said vertical rising unit having a vertical channel and including a plurality of horizontally-spaced parallel plates subdividing said vertical channel into a number of parallel subchannels.

29. A method of removing particles of a first liquid from a second liquid, said first liquid having a greater buoyancy than said second liquid and with said second liquid and said particles of said first liquid being immiscibly combined into a flowing fluid mixture, said method comprising the steps of:

(a) channeling said fluid mixture into a low-turbulence horizontal stream in a serpentine channel comprising a serially joined plurality of channel portions and including a plurality of horizontally spaced parallel plates subdividing at least one portion of said horizontal channel into a number of parallel subchannels having a controlled Reynolds number less than 10,000 while simultaneously constraining the velocity of said fluid mixture to be less than a certain maximum velocity, said horizontal stream having a substantially parabolic longitudinal velocity profile as taken in a transverse plane to the flow of said stream, said parabolic profile having a substantially vertical axis of substantial symmetry; and (b) allowing sufficient time for said particles within said fluid mixture to rise from a first minimum height to a second minimum height toward the surface of said mixture; then, (c) removing said second liquid below said risen particles from said flow.

* * * * *

UNITED STATES PATENT AND TRADEMARK OFFICE
CERTIFICATE OF CORRECTION

PATENT NO. : 5,266,191
DATED : November 30, 1993
INVENTOR(S) : Boyd B. Greene, Naji J. Nassif, & Anderson Scott, Jr.

It is certified that error appears in the above-identified patent and that said Letters Patent is hereby corrected as shown below:

Column 27, line 35 (Claim 16, line 8): "in a serpentine channel" should be --in a serpentine horizontal channel--.

Column 31, line 4 (Claim 29, line 8): "in a serpentine channel" should be --in a serpentine horizontal channel--.

Signed and Sealed this

Fourteenth Day of June, 1994

*Attest:*

BRUCE LEHMAN

*Attesting Officer*     *Commissioner of Patents and Trademarks*